(12) United States Patent
Wystup et al.

(10) Patent No.: US 11,699,968 B2
(45) Date of Patent: Jul. 11, 2023

(54) FAN HEATER MOTOR

(71) Applicant: ebm-papst Mulfingen GmbH & Co. KG, Mulfingen (DE)

(72) Inventors: Ralph Wystup, Kuenzelsau (DE); Philip Kemmet, Heilbronn (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 102 days.

(21) Appl. No.: 17/143,289

(22) Filed: Jan. 7, 2021

(65) Prior Publication Data

US 2021/0211080 A1    Jul. 8, 2021

(30) Foreign Application Priority Data

Jan. 7, 2020   (DE) .................... 10 2020 100 175.4

(51) Int. Cl.
  *H02P 21/13* (2006.01)
  *H02K 3/30* (2006.01)
  *H02K 9/06* (2006.01)
  *H02P 21/14* (2016.01)

(52) U.S. Cl.
  CPC ............. *H02P 21/13* (2013.01); *H02K 3/30* (2013.01); *H02K 9/06* (2013.01); *H02P 21/14* (2013.01)

(58) Field of Classification Search
  CPC . H02K 15/12; H02K 3/30; H02K 9/06; H02P 21/13; H02P 21/14
  See application file for complete search history.

(56) References Cited

U.S. PATENT DOCUMENTS

| | | | | |
|---|---|---|---|---|
| 5,164,626 | A | * | 11/1992 | Oigawa .................... F24H 1/225 336/61 |
| 2011/0181217 | A1 | * | 7/2011 | Vollmer ................ H02P 29/662 318/400.21 |
| 2019/0173413 | A1 | * | 6/2019 | Lian ...................... H02P 21/141 |

FOREIGN PATENT DOCUMENTS

DE            2308274 B2      12/1979

\* cited by examiner

*Primary Examiner* — Said Bouziane
(74) *Attorney, Agent, or Firm* — Harness, Dickey & Pierce, P.L.C.

(57) ABSTRACT

A fan heater (1) has a motor (M) with motor windings (W) and a rotor that is connected to a fan (V) for delivering ambient air at least partially along the motor windings (W). At least one motor winding is configured as a heater winding (HW) for generating a specific heat output or amount of heat as intended.

12 Claims, 2 Drawing Sheets

FAN HEATER MOTOR

CROSS-REFERENCE TO RELATED APPLICATION

Figure 1:
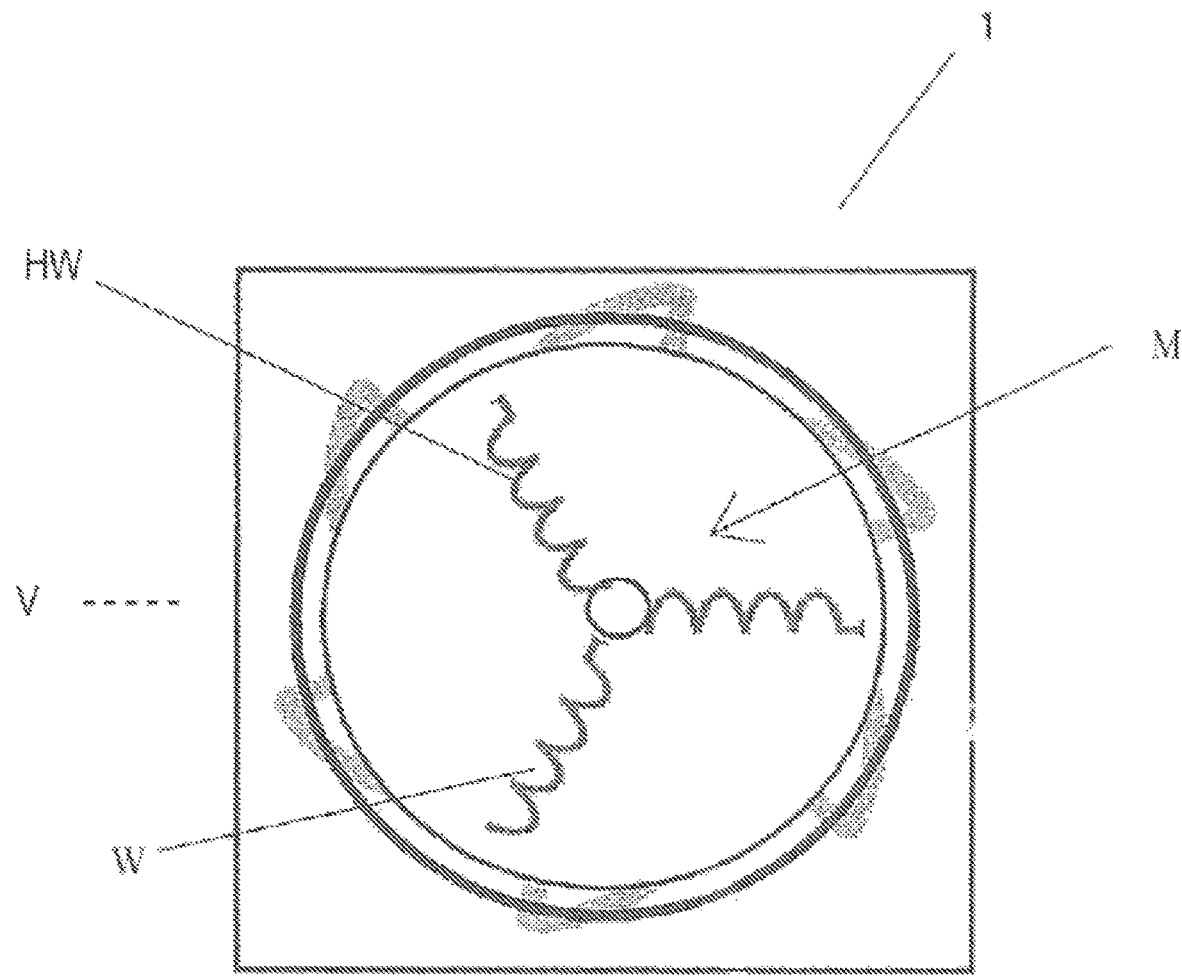

This application claims the benefit and priority of German patent application No. 10 2020 100 175.4, filed Jan. 7, 2020. The entire disclosure of the above application is incorporated herein by reference.

DESCRIPTION

The present disclosure relates to a fan heater motor and a method for controlling the fan heater motor.

BACKGROUND

Fans are, for example, used in connection with heating registers. Commercially available heating devices, such as space heaters, hair driers or the like, work according to the operating principle of taking in the ambient air, heating it in the system by a heating register, and returning the air, as hot air, to the object to be heated or to the environment.

Such solutions have been known for a long time in prior art. A merely exemplary embodiment can be found in patent document DE 2308274 B2. This embodiment shows a fan heater having a housing where a radial fan, with an impeller rotatable, disposed about a vertical axis, an intake opening the is coaxial with the impeller and an outlet opening disposed at an offset in the front housing wall, and a heating register.

The fan heater solutions known from the prior art each need an additional component for heating the air. A heating coil arrangement, or a heating register where heat is generated, is then distributed by the fan.

Another disadvantage of such solutions is the fact that controlling such solutions is complex and tedious. The control variables for the fan must be adjusted to the control variables for a heating register, for example, to bring a specific condition or a specific amount of heat to a desired place. Such solutions are further costly due to the additionally needed components for sensors and heat generation.

Against this technological background, it is the problem of the disclosure to propose a novel and improved fan heater that can be controlled easily and reliably. It is produced at low cost and can do without temperature sensors or transmitters and heat sources such as heating registers.

SUMMARY

The disclosure solves this problem by a fan heater according to the independent claims. The dependent claims contain advantageous embodiments of such a fan heater.

It is a basic idea of the disclosure that, unlike predominantly common in prior art, the motor winding should not, at least not particularly, heat up, for which purpose motor temperature monitors are used.

In the solution of the present disclosure, however, at least one motor winding is intentionally used as a heat source for the fan heater. Thus, an additional heating register can be eliminated. The motor winding of the motor is intentionally configured as a heating coil, such that its heating during motor operation is desired. The motor itself drives a fan that blows the ambient air across its own winding and through the grooves of the motor. In this manner it dissipates the heat from the motor winding.

Another aspect of the present disclosure, relates to temperature detection and control. By means of a sensorless temperature detection and commutation, the fan heater, according to the disclosure, only needs a maximum of 3 connecting lines for feeding in the rotating field of the induction machine. According to the disclosure, the temperature is detected using a Kalman filter.

According to the disclosure, a fan heater including a motor with motor windings and a rotor connected to a fan for delivering ambient air at least partially along the motor windings is proposed. At least one motor winding is intentionally configured as a heater winding for generating a specific heat output or amount of heat as intended.

In a preferred embodiment of the disclosure, the winding wire of the heater winding (HW) is a temperature-resistant insulated heat-conducting wire.

This means that such an insulated heat conducting wire, such as a constantan wire insulated by a ceramic material, is used instead of the usual copper wire. The temperature and also the rotor position are determined by a state estimator (e.g. Kalman filter). Thus, no sensors are needed in temperature critical regions, which allows the use of the device at high temperatures as well. For highest temperatures, a design of the rotor as an asynchronous rotor is suitable, and rare earth magnets can be used for temperatures up to about 400° C., whereas common ferrite magnets can be used for temperatures up to about 120° C.

In a preferred embodiment of the disclosure, the fan heater is controlled by a Kalman filter. Temperature detection using a Kalman filter eliminates the need for highly sensitive and expensive sensors. Thus the heater winding, according to the disclosure, itself is used as a sensor, which allows precise temperature control. By using a combined field-oriented control (FOC) system, the temperature of the heater winding can be controlled separately from the speed. Thus, the volumetric flow is controlled by using the field-producing $i_d$-current. The speed is controlled via the torque-producing current portion, i.e. the $i_q$ portion.

In a preferred embodiment of the disclosure, the temperature of the heater winding and the rotor position of the motor are further controlled by a Kalman filter, particularly by an EKF (EKF=extended Kalman filter).

The extended Kalman filter (EKF) uses an iterative method for estimating states of dynamically nonlinear systems. It provides an iterative calculation structure for solving estimation problems, as in this case temperature estimation and speed estimation. The basic underlying idea is to determine the current error between the ACTUAL measured data (motor currents) and the model simulation (simulated currents). This occurs by predicting a time step using the Kalman filter and to take the resulting deviation accordingly weighted into account for the respective state estimation. A model of the affected motor is stored in the EKF. The input variables of the EKF or the motor model, respectively, are the motor currents and/or the voltages applied to the motor. The EKF estimates the resistance parameter and the rotor position angle by the determined error between the motor currents and the model currents. The temperature of the stator winding can be determined by changing the resistance and using the temperature coefficient of the material used for the heater winding, such as constantan.

It is preferred that the resistance R and the rotor position angle are provided based on the motor model as output variables at the Kalman filter for field-oriented control of the motor. The temperature of the winding can then be determined by the resistance R.

In addition to the design of the heating device, another aspect of the present disclosure relates to a method for operating a fan heater as described above. Here the temperature of the heater winding is controlled by the d portion of the field-producing current, particularly separately from the motor speed.

It is further advantageous to perform the method in such a manner that the speed of the motor is controlled by the torque-producing q portion of the field-producing current.

Other advantageous further developments of the disclosure are characterized in the dependent claims or are explained in more detail below with reference to the figures and together with a preferred embodiment of the disclosure.

DRAWINGS

Figure 2:
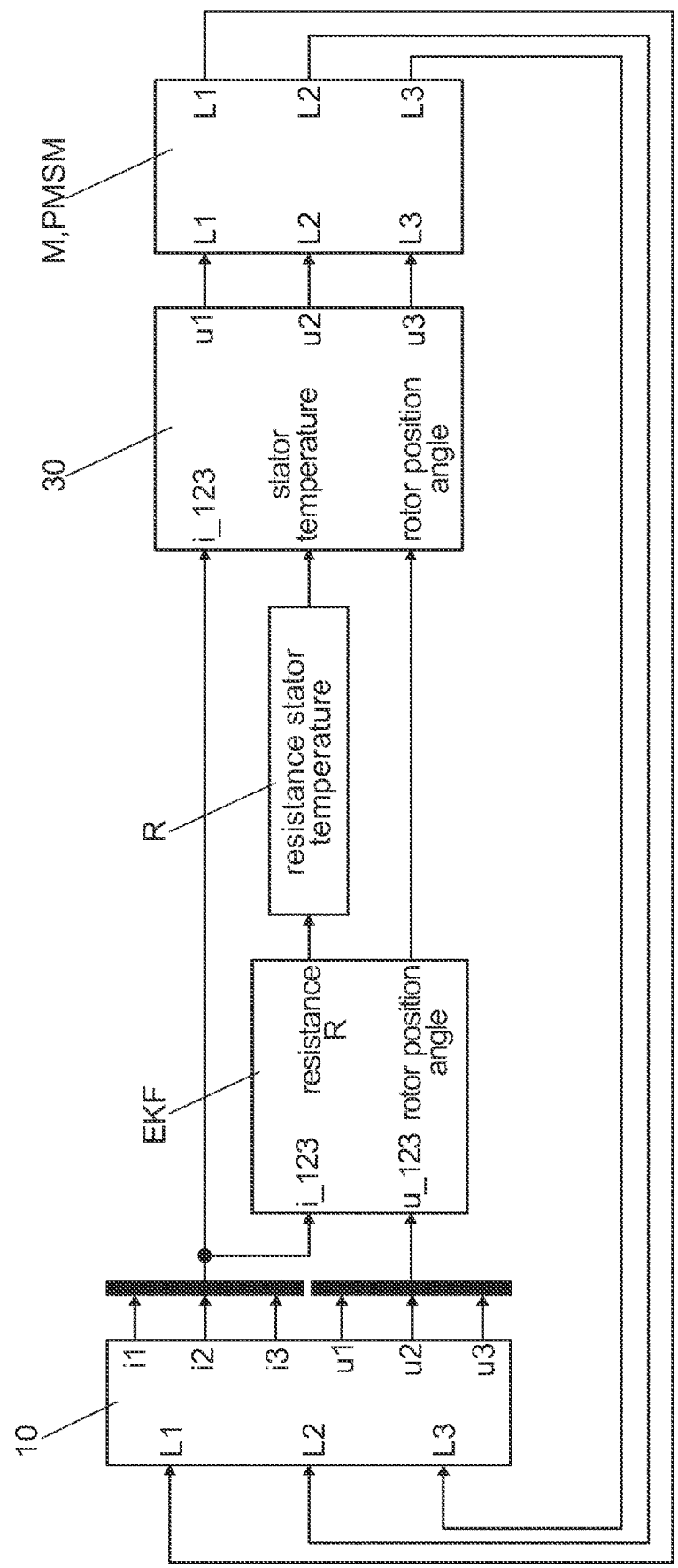

The drawings described herein are for illustrative purposes only of selected embodiments and not all possible implementations, and are not intended to limit the scope of the present disclosure FIG. 1 is a rear schematic system view of the fan heater;

FIG. 2 is a schematic view of a control concept according to the rationale of the disclosure.

DETAILED DESCRIPTION

The disclosure is described in more detail below using an exemplary embodiment and with reference to FIGS. 1 to 2. The same reference numerals indicate same structural and/or functional features.

FIG. 1 shows a schematic system view of a fan heater 1. The fan heater 1 has a motor M with motor windings W and a rotor that is connected to a fan V for delivering ambient air. In this case, one motor winding is configured as a heater winding HW for generating a specific heat output or amount of heat. The motor M itself drives the fan V which blows the ambient air across its windings W and through the grooves of the motor. In this manner, it dissipates the heat from the motor winding in a targeted manner.

FIG. 2 shows a view of a control concept according to the rationale of the present disclosure. The control concept uses a current and voltage measuring device 10, a Kalman filter EKF, a controller 30 for field-oriented control of the motor M, which in this case is a PMSM.

The Kalman filter EKF has a motor model of the PMSM. Motor currents i1, i2, i3 and motor voltages u1, u2, u3, which were initially measured by the current and voltage measuring device 10, are supplied to the input of the Kalman filter EKF. L1, L2, L3 designate phase windings of the motor M.

The Kalman filter EKF determines the resistance R of the heater winding HW based on the input variables of the motor model and from this resistance the stator temperature. Furthermore, the Kalman filter EKF passes the determined rotor position angle with the temperature to the field-oriented controller 30. The PMSM is thus controlled in a field-oriented manner.

The implementation of the disclosure is not limited to the preferred embodiments described above. Instead, a plurality of variants is conceivable where the solution described is used for completely different designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fan heater comprising:
   a motor with integral motor windings, the motor windings positioned in a groove inside a motor housing and a rotor which is connected to a fan for delivering ambient air along the motor windings in the grooves, and at least one motor winding, of the motor windings positioned in the groove in the motor housing, is configured as a heater winding for generating a specific heat output or amount of heat as desired.

2. The fan heater according to claim 1, wherein the winding wire of the heater winding is a temperature-resistant insulated heat-conducting wire, preferably a ceramic insulated constantan wire.

3. The fan heater according to claim 1, wherein the fan heater is operated by a Kalman filter.

4. The fan heater according to claim 3, wherein the temperature of the heater winding and/or the rotor position of the rotor of the motor is controlled by the Kalman filter.

5. The fan heater according to claim 3, wherein the input variables for a Kalman filter are phase currents i123 and the phase voltages u123, while a motor model is stored in the Kalman filter, based on which model the resistance R and the rotor position angle are provided as output variables at the Kalman filter for field-oriented operation of the motor.

6. The fan heater according to claim 1, wherein the temperature of the heater winding is determined by estimating the resistance of the heater winding.

7. A method for operating a fan heater according to claim 1, further comprising the motor operated by a field-oriented control.

8. The method for operating a fan heater according to claim 7 further comprising determining temperature by a Kalman filter.

9. The method for operating a fan heater according to claim 7, further comprising controlling the temperature of the heater winding by a d portion of a field-producing current ($i_d$), separately from speed of the motor.

10. The method for operating a fan heater according to claim 9 further controlling speed of the motor by the torque-producing q portion of the field-producing current ($i_q$).

11. A fan heater comprising:
    a motor with motor windings, the motor windings positioned in a groove inside a motor housing, and a rotor is connected to a fan for delivering ambient air along the motor windings in the grooves, and at least one motor winding, of the motor windings positioned in the groove in the motor housing, is configured as a heater winding for generating a specific heat output or amount of heat as desired; and
    the temperature of the heater winding and/or the rotor position of the rotor of the motor is detected or operated by a Kalman filter.

12. A fan heater comprising:
    a motor with motor windings and a rotor is connected to a fan for delivering ambient air along the motor windings, and at least one motor winding, of the motor windings, is configured as a heater winding for generating a specific heat output or amount of heat as desired; and temperature of the heater winding is controlled by a d portion of a field-producing current ($i_d$), separately from speed of the motor.

* * * * *